US010284454B2

(12) United States Patent
Haggar et al.

(10) Patent No.: US 10,284,454 B2
(45) Date of Patent: *May 7, 2019

(54) AUTOMATIC INCREASING OF CAPACITY OF A VIRTUAL SPACE IN A VIRTUAL WORLD

(71) Applicant: ACTIVISION PUBLISHING, INC., Santa Monica, CA (US)

(72) Inventors: Peter F. Haggar, Raleigh, NC (US); Brian R. Bokor, Raleigh, NC (US); Daniel E. House, Raleigh, NC (US); William B. Nicol, II, Durham, NC (US); Andrew B. Smith, Morrisville, NC (US); Luis J. Ostdiek, Orangevale, CA (US)

(73) Assignee: ACTIVISION PUBLISHING, INC., Santa Monica, CA (US)

( * ) Notice: Subject to any disclaimer, the term of this patent is extended or adjusted under 35 U.S.C. 154(b) by 659 days.

This patent is subject to a terminal disclaimer.

(21) Appl. No.: 14/875,270

(22) Filed: Oct. 5, 2015

(65) Prior Publication Data

US 2016/0164769 A1 Jun. 9, 2016

Related U.S. Application Data

(63) Continuation of application No. 13/341,255, filed on Dec. 30, 2011, now Pat. No. 9,152,914, which is a
(Continued)

(51) Int. Cl.
*G06F 9/50* (2006.01)
*G06F 3/0481* (2013.01)
(Continued)

(52) U.S. Cl.
CPC ............ *H04L 43/16* (2013.01); *A63F 13/358* (2014.09); *G06N 3/006* (2013.01); *H04L 47/822* (2013.01);
(Continued)

(58) Field of Classification Search
CPC .. G06F 3/04815; G06F 3/04817; G06F 3/065; G06F 3/0631; G06F 9/5011;
(Continued)

(56) References Cited

U.S. PATENT DOCUMENTS 3,621,214 A 11/1971 Romney
3,736,564 A 5/1973 Watkins
(Continued)

FOREIGN PATENT DOCUMENTS

AU 768367 3/2004
AU 2005215048 10/2011
(Continued)

OTHER PUBLICATIONS

["What Are Virtual Environments"],IEEE Computer Graphics & Applications, Stephen R. Ellis, Jan. 1994.
(Continued)

*Primary Examiner* — Ting Z Lee
(74) *Attorney, Agent, or Firm* — Novel IP

(57) ABSTRACT

A system for automatically increasing a capacity of a virtual space in a virtual world may include a processor and a module operating on the processor for detecting an attempt by an avatar to enter a virtual space in a virtual world. The system may also include another module for determining if an allowable number of avatars is currently in the virtual space. The allowable number of avatars may be determined by at least a capacity of a server that is hosting the virtual space. Another module may be provided for increasing a capacity of the virtual space when the allowable number of avatars is currently in the virtual space. Increasing the capacity of the virtual space may include spawning a replicate new virtual space on a different server in response to the capacity of the server that is hosting the virtual space reaching the allowable number of avatars.

20 Claims, 9 Drawing Sheets

Related U.S. Application Data continuation of application No. 11/947,829, filed on Nov. 30, 2007, now Pat. No. 8,127,235.

(51) Int. Cl.
| | |
|---|---|
| *G06F 3/06* | (2006.01) |
| *G06N 3/00* | (2006.01) |
| *H04L 12/26* | (2006.01) |
| *A63F 13/358* | (2014.01) |
| *H04L 12/911* | (2013.01) |
| *H04L 29/06* | (2006.01) |

(52) U.S. Cl.
CPC ........ *H04L 67/38* (2013.01); *A63F 2300/534* (2013.01); *A63F 2300/5533* (2013.01); *A63F 2300/5553* (2013.01); *G06F 3/04815* (2013.01); *G06F 3/04817* (2013.01); *G06F 3/065* (2013.01); *G06F 3/0631* (2013.01); *G06F 9/5011* (2013.01)

(58) Field of Classification Search
CPC ........ A63F 2300/534; A63F 2300/5533; A63F 2300/5553; G06N 3/006; H04L 43/16; H04L 47/822; H04L 67/38
See application file for complete search history.

(56) References Cited

U.S. PATENT DOCUMENTS

| | | |
|---|---|---|
| 3,792,243 A | 2/1974 | Appel |
| 3,996,672 A | 12/1976 | Osofsky |
| 4,461,301 A | 7/1984 | Ochs |
| 4,841,292 A | 6/1989 | Zeno |
| 4,879,849 A | 11/1989 | Hollingsworth |
| 4,895,376 A | 1/1990 | Chiang |
| 4,902,469 A | 2/1990 | Watson |
| 4,908,761 A | 3/1990 | Tai |
| 4,970,666 A | 11/1990 | Welsh |
| 5,015,188 A | 5/1991 | Pellosie |
| 5,031,089 A | 7/1991 | Liu |
| 5,058,180 A | 10/1991 | Khan |
| 5,130,794 A | 7/1992 | Ritchey |
| 5,179,656 A | 1/1993 | Lisle |
| 5,255,352 A | 10/1993 | Falk |
| 5,276,785 A | 1/1994 | Mackinlay |
| 5,287,437 A | 2/1994 | Deering |
| 5,295,234 A | 3/1994 | Ishida |
| 5,310,349 A | 5/1994 | Daniels |
| 5,325,472 A | 6/1994 | Horiuchi |
| 5,333,272 A | 7/1994 | Capek |
| 5,339,390 A | 8/1994 | Robertson |
| 5,347,628 A | 9/1994 | Brewer |
| 5,367,614 A | 11/1994 | Bisey |
| 5,371,673 A | 12/1994 | Fan |
| 5,371,851 A | 12/1994 | Pieper |
| 5,381,158 A | 1/1995 | Takahara |
| 5,381,526 A | 1/1995 | Ellson |
| 5,432,895 A | 7/1995 | Myers |
| 5,442,569 A | 8/1995 | Osano |
| 5,442,733 A | 8/1995 | Kaufman |
| 5,452,414 A | 9/1995 | Rosendahl |
| 5,498,003 A | 3/1996 | Gechter |
| 5,502,638 A | 3/1996 | Takenaka |
| 5,502,794 A | 3/1996 | Sakurai |
| 5,522,018 A | 5/1996 | Takeda |
| 5,530,796 A | 6/1996 | Wang |
| 5,535,276 A | 7/1996 | Ganesan |
| 5,537,618 A | 7/1996 | Boulton |
| 5,539,883 A | 7/1996 | Allon |
| 5,555,354 A | 9/1996 | Strasnick |
| 5,561,736 A | 10/1996 | Moore |
| 5,563,946 A | 10/1996 | Cooper |
| 5,577,981 A | 11/1996 | Jarvik |
| 5,584,700 A | 12/1996 | Feldman |
| 5,594,644 A | 1/1997 | Hasegawa |
| 5,594,859 A | 1/1997 | Palmer |
| 5,621,906 A | 4/1997 | Oneill |
| 5,630,129 A | 5/1997 | Wheat |
| 5,633,993 A | 5/1997 | Redmann |
| 5,662,523 A | 9/1997 | Yasumaru |
| 5,675,746 A | 10/1997 | Marshall |
| 5,680,524 A | 10/1997 | Maples |
| 5,685,775 A | 11/1997 | Bakoglu |
| 5,696,892 A | 12/1997 | Redmann |
| 5,702,307 A | 12/1997 | Moran |
| 5,706,507 A | 1/1998 | Schloss |
| 5,708,764 A | 1/1998 | Borrel |
| 5,734,805 A | 3/1998 | Isensee |
| 5,736,982 A | 4/1998 | Suzuki |
| 5,736,985 A | 4/1998 | Lection |
| 5,736,990 A | 4/1998 | Barrus |
| 5,737,416 A | 4/1998 | Cooper |
| 5,737,533 A | 4/1998 | De |
| 5,737,619 A | 4/1998 | Judson |
| 5,745,113 A | 4/1998 | Jordan |
| 5,745,678 A | 4/1998 | Herzberg |
| 5,745,711 A | 4/1998 | Kitahara |
| 5,761,083 A | 6/1998 | Brown |
| 5,762,552 A | 6/1998 | Vuong |
| 5,764,232 A | 6/1998 | Oouchi |
| 5,764,912 A | 6/1998 | Rosborough |
| 5,768,511 A | 6/1998 | Galvin |
| 5,774,668 A | 6/1998 | Choquier |
| 5,796,393 A | 8/1998 | MacNaughton |
| 5,802,294 A | 9/1998 | Ludwig |
| 5,825,877 A | 10/1998 | Dan |
| 5,835,094 A | 11/1998 | Ermel |
| 5,835,692 A | 11/1998 | Cragun |
| 5,850,225 A | 12/1998 | Cosman |
| 5,854,897 A | 12/1998 | Radziewicz |
| 5,860,137 A | 1/1999 | Raz |
| 5,862,337 A | 1/1999 | Gray |
| 5,875,296 A | 2/1999 | Shi |
| 5,878,233 A | 3/1999 | Schloss |
| 5,879,236 A | 3/1999 | Lambright |
| 5,880,731 A | 3/1999 | Liles |
| 5,883,628 A | 3/1999 | Mullaly |
| 5,884,024 A | 3/1999 | Lim |
| 5,884,029 A | 3/1999 | Brush |
| 5,898,423 A | 4/1999 | Tognazzini |
| 5,900,879 A | 5/1999 | Berry |
| 5,903,266 A | 5/1999 | Berstis |
| 5,903,271 A | 5/1999 | Bardon |
| 5,908,469 A | 6/1999 | Botz |
| 5,911,045 A | 6/1999 | Leyba |
| 5,919,045 A | 7/1999 | Tagge |
| 5,920,325 A | 7/1999 | Morgan |
| 5,923,324 A | 7/1999 | Berry |
| 5,926,179 A | 7/1999 | Matsuda |
| 5,933,818 A | 8/1999 | Kasravi |
| 5,938,722 A | 8/1999 | Johnson |
| 5,944,824 A | 8/1999 | He |
| 5,963,915 A | 10/1999 | Kirsch |
| 5,966,129 A | 10/1999 | Matsukuma |
| 5,969,720 A | 10/1999 | Lisle |
| 5,969,724 A | 10/1999 | Berry |
| 5,977,979 A | 11/1999 | Clough |
| 5,978,841 A | 11/1999 | Berger |
| 5,982,372 A | 11/1999 | Brush |
| 5,983,003 A | 11/1999 | Lection |
| 5,990,888 A | 11/1999 | Blades |
| 5,990,896 A | 11/1999 | Barrus |
| 6,003,065 A | 12/1999 | Yan |
| 6,006,223 A | 12/1999 | Agrawal |
| 6,008,848 A | 12/1999 | Tiwari |
| 6,009,455 A | 12/1999 | Doyle |
| 6,014,145 A | 1/2000 | Bardon |
| 6,018,734 A | 1/2000 | Zhang |
| 6,021,268 A | 2/2000 | Johnson |
| 6,023,270 A | 2/2000 | Brush |
| 6,023,698 A | 2/2000 | Lavey |
| 6,025,839 A | 2/2000 | Schell |
| 6,049,819 A | 4/2000 | Buckle |

(56) References Cited

U.S. PATENT DOCUMENTS

| | | |
|---|---|---|
| 6,058,266 A | 5/2000 | Megiddo |
| 6,059,842 A | 5/2000 | Dumarot |
| 6,064,389 A | 5/2000 | Berry |
| 6,069,632 A | 5/2000 | Mullaly |
| 6,070,143 A | 5/2000 | Barney |
| 6,072,498 A | 6/2000 | Brittain |
| 6,081,270 A | 6/2000 | Berry |
| 6,081,271 A | 6/2000 | Bardon |
| 6,088,727 A | 7/2000 | Hosokawa |
| 6,091,410 A | 7/2000 | Lection |
| 6,094,196 A | 7/2000 | Berry |
| 6,098,056 A | 8/2000 | Rusnak |
| 6,101,538 A | 8/2000 | Brown |
| 6,104,406 A | 8/2000 | Berry |
| 6,111,581 A | 8/2000 | Berry |
| 6,115,718 A | 9/2000 | Huberman |
| 6,134,588 A | 10/2000 | Guenthner |
| 6,137,904 A | 10/2000 | Lubin |
| 6,138,128 A | 10/2000 | Perkowitz |
| 6,141,699 A | 10/2000 | Luzzi |
| 6,144,381 A | 11/2000 | Lection |
| 6,148,294 A | 11/2000 | Beyda |
| 6,148,328 A | 11/2000 | Cuomo |
| 6,177,932 B1 | 1/2001 | Galdes |
| 6,179,713 B1 | 1/2001 | James |
| 6,182,067 B1 | 1/2001 | Presnell |
| 6,185,614 B1 | 2/2001 | Cuomo |
| 6,195,657 B1 | 2/2001 | Rucker |
| 6,199,067 B1 | 3/2001 | Geller |
| 6,201,881 B1 | 3/2001 | Masuda |
| 6,212,494 B1 | 4/2001 | Boguraev |
| 6,216,098 B1 | 4/2001 | Clancey |
| 6,219,045 B1 | 4/2001 | Leahy |
| 6,222,551 B1 | 4/2001 | Schneider |
| 6,226,009 B1 | 5/2001 | Carraro |
| 6,233,583 B1 | 5/2001 | Hoth |
| 6,249,779 B1 | 6/2001 | Hitt |
| 6,256,043 B1 | 7/2001 | Aho |
| 6,266,649 B1 | 7/2001 | Linden |
| 6,271,842 B1 | 8/2001 | Bardon |
| 6,271,843 B1 | 8/2001 | Lection |
| 6,275,820 B1 | 8/2001 | Navin-Chandra |
| 6,282,547 B1 | 8/2001 | Hirsch |
| 6,298,374 B1 | 10/2001 | Sasaki |
| 6,308,208 B1 | 10/2001 | Jung |
| 6,311,206 B1 | 10/2001 | Malkin |
| 6,314,465 B1 | 11/2001 | Paul |
| 6,327,541 B1 | 12/2001 | Pitchford |
| 6,329,986 B1 | 12/2001 | Cheng |
| 6,330,281 B1 | 12/2001 | Mann |
| 6,334,127 B1 | 12/2001 | Bieganski |
| 6,334,141 B1 | 12/2001 | Varma |
| 6,336,134 B1 | 1/2002 | Varma |
| 6,337,700 B1 | 1/2002 | Kinoe |
| 6,345,264 B1 | 2/2002 | Breese |
| 6,345,287 B1 | 2/2002 | Fong |
| 6,346,938 B1 | 2/2002 | Chan |
| 6,346,956 B2 | 2/2002 | Matsuda |
| 6,349,091 B1 | 2/2002 | Li |
| 6,351,775 B1 | 2/2002 | Yu |
| 6,353,449 B1 | 3/2002 | Gregg |
| 6,356,297 B1 | 3/2002 | Cheng |
| 6,363,174 B1 | 3/2002 | Lu |
| 6,370,560 B1 | 4/2002 | Robertazzi |
| 6,388,688 B1 | 5/2002 | Schileru-Key |
| 6,393,467 B1 | 5/2002 | Potvin |
| 6,411,312 B1 | 6/2002 | Sheppard |
| 6,418,424 B1 | 7/2002 | Hoffberg |
| 6,418,462 B1 | 7/2002 | Xu |
| 6,421,051 B1 | 7/2002 | Kato |
| 6,426,757 B1 | 7/2002 | Smith |
| 6,437,777 B1 | 8/2002 | Kamachi |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,473,597 B1 | 10/2002 | Johnson |
| 6,496,851 B1 | 12/2002 | Morris |
| 6,499,053 B1 | 12/2002 | Marquette |
| 6,505,208 B1 | 1/2003 | Kanevsky |
| 6,509,925 B1 | 1/2003 | Dermler |
| 6,525,731 B1 | 2/2003 | Suits |
| 6,539,415 B1 | 3/2003 | Mercs |
| 6,549,933 B1 | 4/2003 | Barrett |
| 6,567,109 B1 | 5/2003 | Todd |
| 6,567,813 B1 | 5/2003 | Zhu |
| 6,570,587 B1 | 5/2003 | Efrat |
| 6,574,477 B1 | 6/2003 | Rathunde |
| 6,580,441 B2 | 6/2003 | Schileru-Key |
| 6,580,981 B1 | 6/2003 | Masood |
| 6,594,673 B1 | 7/2003 | Smith |
| 6,598,029 B1 | 7/2003 | Johnson |
| 6,601,084 B1 | 7/2003 | Bhaskaran |
| 6,618,751 B1 | 9/2003 | Challenger |
| 6,631,309 B2 | 10/2003 | Boies |
| 6,636,889 B1 | 10/2003 | Estrada |
| 6,645,153 B2 | 11/2003 | Kroll |
| RE38,375 E | 12/2003 | Herzberg |
| 6,657,617 B2 | 12/2003 | Paolini |
| 6,657,642 B1 | 12/2003 | Bardon |
| 6,672,961 B1 | 1/2004 | Uzun |
| 6,674,484 B1 | 1/2004 | Boland |
| 6,684,255 B1 | 1/2004 | Martin |
| 6,717,600 B2 | 4/2004 | Dutta |
| 6,732,146 B1 | 5/2004 | Miyake |
| 6,734,884 B1 | 5/2004 | Berry |
| 6,742,032 B1 | 5/2004 | Castellani |
| 6,753,857 B1 | 6/2004 | Matsuura |
| 6,763,371 B1 | 7/2004 | Jaendel |
| 6,765,596 B2 | 7/2004 | Lection |
| 6,767,287 B1 | 7/2004 | McQuaid |
| 6,772,195 B1 * | 8/2004 | Hatlelid .............. G06F 3/04815 345/419 |
| 6,781,607 B1 | 8/2004 | Benham |
| 6,784,901 B1 | 8/2004 | Harvey |
| 6,785,592 B1 | 8/2004 | Smith |
| 6,801,930 B1 | 10/2004 | Dionne |
| 6,819,669 B2 | 11/2004 | Rooney |
| 6,826,523 B1 | 11/2004 | Guy |
| 6,832,239 B1 | 12/2004 | Kraft |
| 6,836,480 B2 | 12/2004 | Basso |
| 6,845,389 B1 | 1/2005 | Sen |
| 6,886,026 B1 | 4/2005 | Hanson |
| 6,912,565 B1 | 6/2005 | Powers |
| 6,937,946 B1 | 8/2005 | Culp |
| 6,941,236 B2 | 9/2005 | Huelsbergen |
| 6,948,168 B1 | 9/2005 | Kuprionas |
| RE38,865 E | 11/2005 | Dumarot |
| 6,970,929 B2 | 11/2005 | Bae |
| 6,981,223 B2 | 12/2005 | Becker |
| 6,982,372 B1 | 1/2006 | England |
| 6,985,937 B1 | 1/2006 | Keshav |
| 6,990,381 B2 | 1/2006 | Nomura |
| 6,993,596 B2 | 1/2006 | Hinton |
| 7,006,616 B1 | 2/2006 | Christofferson |
| 7,028,296 B2 | 4/2006 | Irfan |
| 7,062,533 B2 | 6/2006 | Brown |
| 7,089,266 B2 | 8/2006 | Stolte |
| 7,096,360 B1 | 8/2006 | Fries |
| 7,124,071 B2 | 10/2006 | Rich |
| 7,135,956 B2 | 11/2006 | Bartone |
| 7,139,792 B1 | 11/2006 | Mishra |
| 7,143,409 B2 | 11/2006 | Herrero |
| 7,146,627 B1 | 12/2006 | Ismail |
| 7,155,680 B2 | 12/2006 | Akazawa |
| 7,159,217 B2 | 1/2007 | Pulsipher |
| 7,171,287 B2 | 1/2007 | Weiss |
| 7,185,067 B1 | 2/2007 | Viswanath |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |

(56) References Cited

U.S. PATENT DOCUMENTS

| | | | |
|---|---|---|---|
| 7,269,632 | B2 | 9/2007 | Edecker |
| 7,287,053 | B2 | 10/2007 | Bodin |
| 7,293,235 | B1 | 11/2007 | Powers |
| 7,305,438 | B2 | 12/2007 | Christensen |
| 7,308,476 | B2 | 12/2007 | Mannaru |
| 7,353,295 | B1 | 4/2008 | Crow |
| 7,358,973 | B2 | 4/2008 | Herbrich |
| 7,386,799 | B1 * | 6/2008 | Clanton ............... A63F 13/12 715/753 |
| 7,404,149 | B2 | 7/2008 | Fox |
| 7,426,538 | B2 | 9/2008 | Bodin |
| 7,427,980 | B1 | 9/2008 | Partridge |
| 7,428,588 | B2 | 9/2008 | Berstis |
| 7,429,987 | B2 | 9/2008 | Leah |
| 7,436,407 | B2 | 10/2008 | Doi |
| 7,439,975 | B2 | 10/2008 | Hsu |
| 7,443,393 | B2 | 10/2008 | Shen |
| 7,447,996 | B1 | 11/2008 | Cox |
| 7,467,180 | B2 | 12/2008 | Kaufman |
| 7,467,181 | B2 | 12/2008 | McGowan |
| 7,475,354 | B2 | 1/2009 | Guido |
| 7,478,127 | B2 | 1/2009 | Creamer |
| 7,484,012 | B2 | 1/2009 | Hinton |
| 7,503,007 | B2 | 3/2009 | Goodman |
| 7,506,264 | B2 | 3/2009 | Polan |
| 7,509,369 | B1 | 3/2009 | Tormasov |
| 7,515,136 | B1 | 4/2009 | Kanevsky |
| 7,515,156 | B2 | 4/2009 | Tinker |
| 7,517,282 | B1 | 4/2009 | Pryor |
| 7,525,964 | B2 | 4/2009 | Astley |
| 7,552,177 | B2 | 6/2009 | Kessen |
| 7,565,650 | B2 | 7/2009 | Bhogal |
| 7,571,224 | B2 | 8/2009 | Childress |
| 7,571,389 | B2 | 8/2009 | Broussard |
| 7,580,888 | B2 | 8/2009 | Ur |
| 7,587,492 | B2 | 9/2009 | Dyck |
| 7,590,984 | B2 | 9/2009 | Kaufman |
| 7,596,596 | B2 | 9/2009 | Chen |
| 7,640,587 | B2 | 12/2009 | Fox |
| 7,643,673 | B2 | 1/2010 | Rohlf |
| 7,667,701 | B2 | 2/2010 | Leah |
| 7,698,656 | B2 | 4/2010 | Srivastava |
| 7,702,784 | B2 | 4/2010 | Berstis |
| 7,714,867 | B2 | 5/2010 | Doi |
| 7,719,532 | B2 | 5/2010 | Schardt |
| 7,719,535 | B2 | 5/2010 | Tadokoro |
| 7,734,691 | B2 | 6/2010 | Creamer |
| 7,737,969 | B2 | 6/2010 | Shen |
| 7,743,095 | B2 | 6/2010 | Goldberg |
| 7,747,679 | B2 | 6/2010 | Galvin |
| 7,765,478 | B2 | 7/2010 | Reed |
| 7,768,514 | B2 | 8/2010 | Pagan |
| 7,773,087 | B2 | 8/2010 | Fowler |
| 7,774,407 | B2 | 8/2010 | Daly |
| 7,782,318 | B2 | 8/2010 | Shearer |
| 7,792,263 | B2 | 9/2010 | D Amora |
| 7,792,801 | B2 | 9/2010 | Hamilton, II |
| 7,796,128 | B2 | 9/2010 | Radzikowski |
| 7,805,680 | B2 | 9/2010 | Meyers |
| 7,808,500 | B2 | 10/2010 | Shearer |
| 7,814,152 | B2 | 10/2010 | McGowan |
| 7,814,154 | B1 | 10/2010 | Kandekar |
| 7,827,208 | B2 | 11/2010 | Bosworth |
| 7,827,318 | B2 | 11/2010 | Hinton |
| 7,843,471 | B2 | 11/2010 | Doan |
| 7,844,663 | B2 | 11/2010 | Boutboul |
| 7,847,799 | B2 | 12/2010 | Taubin |
| 7,853,594 | B2 | 12/2010 | Elder |
| 7,856,469 | B2 | 12/2010 | Chen |
| 7,873,485 | B2 | 1/2011 | Castelli |
| 7,882,222 | B2 | 2/2011 | Dolbier |
| 7,882,243 | B2 | 2/2011 | Ivory |
| 7,884,819 | B2 | 2/2011 | Kuesel |
| 7,886,045 | B2 | 2/2011 | Bates |
| 7,890,623 | B2 | 2/2011 | Bates |
| 7,893,936 | B2 | 2/2011 | Shearer |
| 7,904,829 | B2 | 3/2011 | Fox |
| 7,921,128 | B2 | 4/2011 | Hamilton, II |
| 7,940,265 | B2 | 5/2011 | Brown |
| 7,945,620 | B2 | 5/2011 | Bou-Ghannam |
| 7,945,802 | B2 | 5/2011 | Hamilton, II |
| 7,970,837 | B2 | 6/2011 | Lyle |
| 7,970,840 | B2 | 6/2011 | Cannon |
| 7,985,138 | B2 | 7/2011 | Acharya |
| 7,990,387 | B2 | 8/2011 | Hamilton, II |
| 7,996,164 | B2 | 8/2011 | Hamilton, II |
| 8,001,161 | B2 | 8/2011 | Finn |
| 8,004,518 | B2 | 8/2011 | Fowler |
| 8,005,025 | B2 | 8/2011 | Bodin |
| 8,006,182 | B2 | 8/2011 | Bates |
| 8,013,861 | B2 | 9/2011 | Hamilton, II |
| 8,018,453 | B2 | 9/2011 | Fowler |
| 8,018,462 | B2 | 9/2011 | Bhogal |
| 8,019,797 | B2 | 9/2011 | Hamilton, II |
| 8,019,858 | B2 | 9/2011 | Bauchot |
| 8,022,948 | B2 | 9/2011 | Garbow |
| 8,022,950 | B2 | 9/2011 | Brown |
| 8,023,048 | B2 | 9/2011 | Dacosta |
| 8,026,913 | B2 | 9/2011 | Garbow |
| 8,028,021 | B2 | 9/2011 | Reisinger |
| 8,028,022 | B2 | 9/2011 | Brownholtz |
| 8,037,416 | B2 | 10/2011 | Bates |
| 8,041,614 | B2 | 10/2011 | Bhogal |
| 8,046,700 | B2 | 10/2011 | Bates |
| 8,051,462 | B2 | 11/2011 | Hamilton, II |
| 8,055,656 | B2 | 11/2011 | Cradick |
| 8,056,121 | B2 | 11/2011 | Hamilton, II |
| 8,057,307 | B2 | 11/2011 | Berstis |
| 8,062,130 | B2 | 11/2011 | Smith |
| 8,063,905 | B2 | 11/2011 | Brown |
| 8,070,601 | B2 | 12/2011 | Acharya |
| 8,082,245 | B2 | 12/2011 | Bates |
| 8,085,267 | B2 | 12/2011 | Brown |
| 8,086,544 | B2 | 12/2011 | Boss |
| 8,089,481 | B2 | 1/2012 | Shearer |
| 8,092,288 | B2 | 1/2012 | Theis |
| 8,095,881 | B2 | 1/2012 | Reisinger |
| 8,099,338 | B2 | 1/2012 | Betzler |
| 8,099,668 | B2 | 1/2012 | Garbow |
| 8,102,334 | B2 | 1/2012 | Brown |
| 8,103,640 | B2 | 1/2012 | Lo |
| 8,103,959 | B2 | 1/2012 | Cannon |
| 8,105,165 | B2 | 1/2012 | Karstens |
| 8,108,774 | B2 | 1/2012 | Finn |
| 8,113,959 | B2 | 2/2012 | De Judicibus |
| 8,117,551 | B2 | 2/2012 | Cheng |
| 8,125,485 | B2 | 2/2012 | Brown |
| 8,127,235 | B2 | 2/2012 | Haggar |
| 8,127,236 | B2 | 2/2012 | Hamilton, II |
| 8,127,297 | B2 | 2/2012 | Hamilton |
| 8,128,487 | B2 | 3/2012 | Hamilton, II |
| 8,131,740 | B2 | 3/2012 | Cradick |
| 8,132,235 | B2 | 3/2012 | Bussani |
| 8,134,560 | B2 | 3/2012 | Bates |
| 8,139,060 | B2 | 3/2012 | Brown |
| 8,139,780 | B2 | 3/2012 | Shearer |
| 8,140,340 | B2 | 3/2012 | Bhogal |
| 8,140,620 | B2 | 3/2012 | Creamer |
| 8,140,978 | B2 | 3/2012 | Betzler |
| 8,140,982 | B2 | 3/2012 | Hamilton, II |
| 8,145,676 | B2 | 3/2012 | Bhogal |
| 8,145,725 | B2 | 3/2012 | Dawson |
| 8,149,241 | B2 | 4/2012 | Do |
| 8,150,941 | B2 | 4/2012 | Edecker |
| 8,151,191 | B2 | 4/2012 | Nicol, II |
| 8,156,184 | B2 | 4/2012 | Kurata |
| 8,165,350 | B2 | 4/2012 | Fuhrmann |
| 8,171,407 | B2 | 5/2012 | Huang |
| 8,171,408 | B2 | 5/2012 | Dawson |
| 8,171,559 | B2 | 5/2012 | Hamilton, II |
| 8,174,541 | B2 | 5/2012 | Greene |
| 8,176,421 | B2 | 5/2012 | Dawson |
| 8,176,422 | B2 | 5/2012 | Bergman |
| 8,184,092 | B2 | 5/2012 | Cox |

(56) References Cited

U.S. PATENT DOCUMENTS

| | | |
|---|---|---|
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,214,843 B2 | 7/2012 | Boss |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,016 B2 | 7/2012 | Boss |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,327,376 B2 | 12/2012 | Hamilton, II |
| 8,334,871 B2 | 12/2012 | Hamilton, II |
| 8,341,640 B2 | 12/2012 | Hamilton, II |
| 8,347,235 B2 | 1/2013 | Allen |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,667,498 B2 | 3/2014 | Hamilton, II |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,268,385 B2 | 2/2016 | Hamilton, II |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2001/0044725 A1 | 11/2001 | Matsuda |
| 2001/0055039 A1 | 12/2001 | Matsuda |
| 2002/0007317 A1 | 1/2002 | Callaghan |
| 2002/0010776 A1 | 1/2002 | Lerner |
| 2002/0015003 A1 | 2/2002 | Kato |
| 2002/0023159 A1 | 2/2002 | Vange |
| 2002/0026477 A1 | 2/2002 | Choi |
| 2002/0035593 A1 | 3/2002 | Salim |
| 2002/0041327 A1 | 4/2002 | Hildreth |
| 2002/0043568 A1 | 4/2002 | Hess |
| 2002/0056006 A1 | 5/2002 | Vange |
| 2002/0062177 A1 | 5/2002 | Hannaford |
| 2002/0065870 A1 | 5/2002 | Baehr-Jones |
| 2002/0078192 A1 | 6/2002 | Kopsell |
| 2002/0095586 A1 | 7/2002 | Doyle |
| 2002/0107918 A1 | 8/2002 | Shaffer |
| 2002/0112002 A1 | 8/2002 | Abato |
| 2002/0116466 A1 | 8/2002 | Trevithick |
| 2002/0124137 A1 | 9/2002 | Ulrich |
| 2002/0130904 A1 | 9/2002 | Becker |
| 2002/0135618 A1 | 9/2002 | Maes |
| 2002/0138607 A1 | 9/2002 | O |
| 2002/0152147 A1 | 10/2002 | Shulman |
| 2002/0158873 A1 | 10/2002 | Williamson |
| 2002/0184373 A1 | 12/2002 | Maes |
| 2003/0008712 A1 | 1/2003 | Poulin |
| 2003/0037131 A1 | 2/2003 | Verma |
| 2003/0040946 A1 | 2/2003 | Sprenger |
| 2003/0050977 A1 | 3/2003 | Puthenkulam |
| 2003/0055892 A1 | 3/2003 | Huitema |
| 2003/0056002 A1 | 3/2003 | Trethewey |
| 2003/0057884 A1 | 3/2003 | Dowling |
| 2003/0067554 A1 | 4/2003 | Klarfeld |
| 2003/0084094 A1 | 5/2003 | Shim |
| 2003/0084172 A1 | 5/2003 | Dejong |
| 2003/0084302 A1 | 5/2003 | De |
| 2003/0110399 A1 | 6/2003 | Rail |
| 2003/0122858 A1 | 7/2003 | Mauve |
| 2003/0126318 A1 | 7/2003 | Nomura |
| 2003/0128210 A1 | 7/2003 | Muffler |
| 2003/0135621 A1 | 7/2003 | Romagnoli |
| 2003/0145128 A1 | 7/2003 | Baird |
| 2003/0149781 A1 | 8/2003 | Yared |
| 2003/0163733 A1 | 8/2003 | Barriga-Caceres |
| 2003/0172174 A1 | 9/2003 | Mihalcheon |
| 2003/0177187 A1 | 9/2003 | Levine |
| 2003/0187984 A1 | 10/2003 | Banavar |
| 2003/0190951 A1 | 10/2003 | Matsumoto |
| 2003/0195957 A1 | 10/2003 | Banginwar |
| 2003/0210271 A1 | 11/2003 | King |
| 2003/0212760 A1 | 11/2003 | Chen |
| 2004/0002380 A1 | 1/2004 | Brosnan |
| 2004/0014514 A1 | 1/2004 | Yacenda |
| 2004/0034831 A1 | 2/2004 | Grober |
| 2004/0059436 A1 | 3/2004 | Anderson |
| 2004/0088303 A1 | 5/2004 | Elder |
| 2004/0098142 A1 | 5/2004 | Warren |
| 2004/0103079 A1 | 5/2004 | Tokusho |
| 2004/0113756 A1 | 6/2004 | Mollenkopf |
| 2004/0130549 A1 | 7/2004 | Tinker |
| 2004/0210627 A1 | 10/2004 | Kroening |
| 2004/0215536 A1 | 10/2004 | Deliwala |
| 2004/0228291 A1 | 11/2004 | Huslak |
| 2004/0244006 A1 | 12/2004 | Kaufman |
| 2004/0252123 A1 | 12/2004 | Estrada |
| 2004/0254899 A1 | 12/2004 | Abe |
| 2004/0261037 A1 | 12/2004 | Ording |
| 2005/0015571 A1 | 1/2005 | Kaufman |
| 2005/0021484 A1 | 1/2005 | Bodin |
| 2005/0022139 A1 | 1/2005 | Gettman |
| 2005/0024362 A1 | 2/2005 | Klein |
| 2005/0024376 A1 | 2/2005 | Gettman |
| 2005/0033601 A1 | 2/2005 | Kirby |
| 2005/0050137 A1 | 3/2005 | Bodin |
| 2005/0071462 A1 | 3/2005 | Bodin |
| 2005/0080894 A1 | 4/2005 | Apostolopoulos |
| 2005/0165512 A1 | 7/2005 | Peljto |
| 2005/0210413 A1 | 9/2005 | Quek |
| 2005/0216346 A1 | 9/2005 | Kusumoto |
| 2005/0246711 A1 | 11/2005 | Berstis |
| 2005/0253843 A1 | 11/2005 | Losasso |
| 2005/0278323 A1 | 12/2005 | Horvitz |
| 2006/0010229 A1 | 1/2006 | Chen |
| 2006/0026233 A1 | 2/2006 | Tenenbaum |
| 2006/0038805 A1 | 2/2006 | Yun-Wen |
| 2006/0080613 A1 | 4/2006 | Savant |
| 2006/0085759 A1 | 4/2006 | Knapheide |
| 2006/0094501 A1 | 5/2006 | Oleary |
| 2006/0119598 A1 | 6/2006 | Littlefield |
| 2006/0123351 A1 | 6/2006 | Littlefield |
| 2006/0135261 A1 | 6/2006 | Kinne |
| 2006/0212900 A1 | 9/2006 | Ismail |
| 2006/0230407 A1 | 10/2006 | Rosu |

(56) References Cited

U.S. PATENT DOCUMENTS

| | | |
|---|---|---|
| 2006/0284792 A1 | 12/2006 | Foxlin |
| 2007/0005466 A1 | 1/2007 | Rosenblatt |
| 2007/0035548 A1 | 2/2007 | Jung |
| 2007/0050721 A1 | 3/2007 | De |
| 2007/0061201 A1 | 3/2007 | Ellis |
| 2007/0097206 A1 | 5/2007 | Houvener |
| 2007/0218965 A1 | 9/2007 | Tilston |
| 2007/0219645 A1 | 9/2007 | Thomas |
| 2007/0240119 A1 | 10/2007 | Ducheneaut |
| 2007/0244604 A1 | 10/2007 | McNally |
| 2008/0059972 A1 | 3/2008 | Ding |
| 2008/0070684 A1 | 3/2008 | Haigh-Hutchinson |
| 2008/0074415 A1 | 3/2008 | Woo |
| 2008/0086696 A1 | 4/2008 | Sri |
| 2008/0102809 A1 | 5/2008 | Beyer |
| 2008/0134056 A1 | 6/2008 | Shuster |
| 2008/0177423 A1 | 7/2008 | Brickfield |
| 2008/0207322 A1 | 8/2008 | Mizrahi |
| 2008/0207327 A1 | 8/2008 | Van |
| 2008/0255899 A1 | 10/2008 | McConnell |
| 2008/0270605 A1 | 10/2008 | Berstis |
| 2008/0291217 A1 | 11/2008 | Vincent |
| 2008/0301405 A1 | 12/2008 | Kaufman |
| 2008/0313011 A1 | 12/2008 | Rose |
| 2008/0320514 A1 | 12/2008 | Dacosta |
| 2009/0013052 A1 | 1/2009 | Robarts |
| 2009/0063228 A1 | 3/2009 | Forbes |
| 2009/0064052 A1 | 3/2009 | Mihalcheon |
| 2009/0077158 A1 | 3/2009 | Riley |
| 2009/0077475 A1 | 3/2009 | Koster |
| 2009/0089157 A1 | 4/2009 | Narayanan |
| 2009/0094535 A1 | 4/2009 | Bromenshenkel |
| 2009/0109229 A1 | 4/2009 | Hamilton |
| 2009/0113338 A1 | 4/2009 | Hamilton |
| 2009/0113421 A1 | 4/2009 | Hamilton |
| 2009/0113448 A1 | 4/2009 | Smith |
| 2009/0118019 A1 | 5/2009 | Perlman |
| 2009/0165140 A1 | 6/2009 | Robinson |
| 2009/0187782 A1 | 7/2009 | Greene |
| 2009/0222276 A1 | 9/2009 | Romney |
| 2009/0267938 A1 | 10/2009 | Nicol |
| 2009/0276718 A1 | 11/2009 | Dawson |
| 2009/0278841 A1 | 11/2009 | Hamilton |
| 2009/0281743 A1 | 11/2009 | Hamilton |
| 2009/0281885 A1 | 11/2009 | Castelli |
| 2009/0281886 A1 | 11/2009 | Castelli |
| 2010/0011312 A1 | 1/2010 | Banerjee |
| 2010/0050004 A1 | 2/2010 | Hamilton |
| 2010/0052872 A1 | 3/2010 | Boss |
| 2010/0057529 A1 | 3/2010 | Boss |
| 2010/0057625 A1 | 3/2010 | Boss |
| 2010/0057641 A1 | 3/2010 | Boss |
| 2010/0058350 A1 | 3/2010 | Boss |
| 2010/0070807 A1 | 3/2010 | Hamilton |
| 2010/0083107 A1 | 4/2010 | Allen |
| 2010/0107084 A1 | 4/2010 | Hamilton |
| 2010/0220097 A1 | 9/2010 | Hamilton |
| 2010/0332997 A1 | 12/2010 | Hamilton |
| 2011/0055726 A1 | 3/2011 | Hamilton |
| 2011/0113018 A1 | 5/2011 | Hamilton |
| 2011/0131226 A1 | 6/2011 | Chandra |
| 2011/0225276 A1 | 9/2011 | Hamilton |
| 2011/0254853 A1 | 10/2011 | Hamilton |
| 2012/0113127 A1 | 5/2012 | Hamilton |
| 2012/0117233 A1 | 5/2012 | Hamilton |
| 2012/0188278 A1 | 7/2012 | Hamilton |
| 2013/0002667 A1 | 1/2013 | Hamilton, II |
| 2014/0344725 A1 | 11/2014 | Bates |
| 2016/0191671 A1 | 6/2016 | Dawson |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0940960 A1 | 9/1999 |
| EP | 0998091 A2 | 5/2000 |
| EP | 1020804 A2 | 7/2000 |
| EP | 0627728 B1 | 9/2000 |
| EP | 1089516 A2 | 4/2001 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 1852829 A1 | 11/2007 |
| EP | 2076888 B1 | 7/2015 |
| GB | 2339938 | 10/2002 |
| GB | 2352154 | 7/2003 |
| JP | H0759945 A | 3/1995 |
| JP | H07254072 A | 10/1995 |
| JP | H1198134 A | 4/1999 |
| JP | H11191097 A | 4/1999 |
| JP | 11191097 | 7/1999 |
| JP | 3033956 B2 | 4/2000 |
| JP | 3124916 B2 | 1/2001 |
| JP | 2001119403 A | 4/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 2003061263 | 2/2003 |
| JP | 2003061263 A | 2/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |

(56) References Cited

FOREIGN PATENT DOCUMENTS

| TW | 5159375 B2 | 3/2013 |
|---|---|---|
| WO | 9504331 A1 | 2/1995 |
| WO | 9642041 A2 | 12/1996 |
| WO | 9900960 A1 | 1/1999 |
| WO | 0137162 A2 | 5/2001 |
| WO | 0201455 A2 | 1/2002 |
| WO | 0203645 A2 | 1/2002 |
| WO | 2002073457 | 9/2002 |
| WO | 20020087156 | 10/2002 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

["Synchronous Writing Environment : Real-time interaction in cyberspace"], Journal of Adolescent & Adult Literacy, Oct. 1996.
Wi. Clement, "An Instructional robotics and machine Vision Laboratory," IEEE Transactions on Education, pp. 87-90, 1994.
http://www.news.com.SpecialFeatrues/Continued/0,6,4804 4,00.html, "Billboards on the Infobahn," pp. 1-2, May 23, 1997.
Kohda, Youji, et al., Ubiquitous advertising on the WWW. Merging advertisement on the browser, Computer Networks and IDSN Systems, 28, pp. 1493-1499 (1996).
Jacobson, J., "Collision avoidance in virtual environments," 1997 IEEE Int. Conf. on SMC pp. 1704-1709.
Kormann et al., "Risks of the Passport Single Signon Protocol"< 9th Intl. WWW Conf., May 15, 2000.
Syverson, "Limitations on design principles for public key protocols", Proc. of 1996 IEEE Symposium on Security and Privacy, pp. 62-72, May 6, 1996.
Abadi et al., "Prudent Engineering Practice for Cryptogrphic Protocols", Proc. of 1994 IEEE Computer Society Symposium on Research in Security and Privacy, pp. 122-136, May 16, 1994.
Kautz, H., B. Selman, M. Shah.. "Referral Web: Combining Social Networks and Collaborative Filtering". Communications of the ACM, vol. 40, No. 3, Mar. 1997.
Schwartz, M. F., D. C. M. Wood. "Discovering shared interests among people using graph analysis of global electronic mail traffic". Department of Computer Science, University of Colorado, Boulder CO. Oct. 1992.
Wellman, B. "For a social network analysis of computer networks: a sociological perspective on collaborative work and virtual community". Proceedings of the 1996 conference on ACM SIGCPR/SIGMIS. 1-11.
Qureshi, S. "Supporting electronic group processes: a social perspective". Proceedings of the 1995 ACM SIGCPR Conference on Supporting teams, groups, and learning inside the IS function. ACM Press. 24-34.
Ackerman, M.S., B. Starr. "Social activity indicators: interface components for CSCW systems". Proceedings of the 8th ACM Symposium on User Interface and Software Technology. ACM Press. 159-168, Nov. 14-17, 1995.
Garton, L., C. Haythornthwaite, B. Wellman. "Studying on-line social networks in Doing Internet Research", Jun. 1997.
Srivastava, Jaidepp, Robert Cooley, Mukund Deshpande, Pang-Ning Tan. "Web Usage Mining: Discovery and Applications of Usage Patterns from Web Data". SIGKDD Explorations, vol. 1, Issue 2. Jan. 2000. 12-23.
Wang, Y. "Web Mining and Knowledge Discovery of Usage Patterns". CS748T Project (Part I) Feb. 2000.
Sack, W. "Conversation Map: a content-based Usenet newsgroup browser". Proceedings of the 2000 International Conference on Intelligent User Interfaces. ACM Press. 233-240.
Feldman, R. "Mining unstructured data". Tutorial notes for ACK SIGKDD 1999. AMC Press. 182-236.
Supplementary European Search from the European Patent Office for EP05723458.5, dated Jul. 19, 2010.
International Search Report as Published as WO2005/079538 in corresponding international application No. PCT/US2005/005550. dated Jul. 5, 2006.
Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.
"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297.
Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI= http://doi.acm.org/10.1145/566500.566504.
IBM developer Works, OptimalGrid—autonomic computing on the Grid, James H. Kaufman; Tobin J. Lehman; Glenn Deen; and John Thomas, Jun. 2003.
IBM, Transcoding: Extending e-business to new environments, Britton et al., Sep. 22, 2000.
Lee et al., "A Self-Adjusting Data Distribution Mechanism for Multidimensional Load Balancing in Multiprocessor-Based Database Systems," Information Systems vol. 19, No. 7, pp. 549-567, 1994.
Ma et al., "A Scalable Parallel Cell-Projection Volume Rendering Algorithm for Three-Dimensional Unstructured Data", IEEE 1997, pp. 1-10.
Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.
Hassen et al., "A Task-and Data-Parallel Programming Language Based on Shared Objects," ACM Transactions on Programming Languages and Systems, vol. 20, No. 6, Nov. 1998, pp. 1131-1170.
Andert, "A Simulation of Dynamic Task Allocation in a Distributed Computer System," Proceedings of the 1987 Winter Simulation Conference, 1987, pp. 1-9.
Jim X. Chen, Yonggao Yang, and Bowen Loftin, 2003, "MUVEES: a PC-based Multi-User Virtual Environment for Learning", Proceedings of the IEEE Virtual Reality 2003 (VR '03), IEEE Computer Society, Washington, DC, USA, pp. 163-170.
Fernando, et al., "Cloning and teleporting avatars across workstations and mobile devices in collaborative virtual environments: Clipboard operations for virtual reality", Proceedings ICIA'05: Int. Conf. on Information and Automation, Colombo, Sri Lanka, Dec. 15-18, 2005, pp. 133-140.
Anonymous; Window (computing); Download date: Jun. 3, 2007; Wikipedia; http://en.wikipedia.org/wiki/Window.sub.—(computing).
A. Newitz, "Your Second Life is ready," Popular Science, Oct. 2006, 4 pages: http://www.popsci.com/popsci/technology/7balaf8f3812d010vgnvcm1000-004eecbccdrcrd.html.
Judson et al., "Virtual Venue Management Users Guide", Argonne National Laboratory, Mathematics and Computer Science Division, Technical Memorandum No. 287, Feb. 2006, 19 pages, downloaded from: http://scholar.google.com/scholar?cluster=14486023041208461039&hl=en&as.s- ub.--sdt=80000000000000.
Stardock.com; The User Guide—Version 2; DesktopX, 2000; 52 pages.
Wang; SmartCU3D: a collaborative virtual environment system with behavior based interaction management; Proceedings of the ACM Symposium on Virtual Reality Software and Tech; VRST '01, Nov. 15-17, 2001, pp. 25-32.

(56) References Cited

OTHER PUBLICATIONS

Celentano; Adaptive interaction in Web3D virtual worlds; Proceedings of the Ninth International Conference on 3D Web Technology; Apr. 2004; pp. 41-50.

Chittaro; Dynamic generation of personalized VRML content; Proceedings of the Seventh International Conference on 3D Web Technology; Feb. 2002; pp. 145-154.

Elvins, T. T., Nadeau, D. R., Schul, R., and Kirsh, D., "Worldlets: 3D thumbnails for 3D browsing", Proceedings of the SIGCHI Conference on Human Factors in Computing Systems, Apr. 18-23, 1998, Conference on Human Factors in Computing Systems. ACM Press/Addison-Wesley Publishing Co., New York, NY, 163-170.

Elvins; Worldlets-3D Thumbnails for Wayfinding in virtual environments;Proceedings of the 10th Annual ACM Symposium on User Interface Software and; Oct. 1997; pp. 21-30.

Elvins, T.T., et al; Wordlets: 3D thumbnails for 3D browsing; Proceedings of the SIGCHI Conference on Human Factors in Computing systems; Apr. 18-23, 1998; ACM Press/Addison-Wesley Publishing Co., NY, NY; pp. 163-170.

Amund Tveit; Customizing Cyberspace: Methods for User Representation and Prediction; Thesis, Department of Computer Science, Norwegian University of Science and Technology; Trondheim, Norway; Jul. 1, 2004; 187 pages.

Grammenos, D., Filou, M., Papadakos, P., and Stephanidis, C., "Virtual Prints: leaving trails in virtual environments", Proceedings of the Workshop on Virtual Environments 2002, May 30-31, 2002, W. Sturzlinger and S. Muller, Eds., ACM International Conference Proceeding Series, vol. 23. Eurographics Association, pp. 131-138, 222.

Stardock.com et al., "The User Guide-Version 2", DesktopX, 2000, 57 pages.

Elvins, T. T., Nadeau, D. R., and Kirsh, D. 1997. Worldlets-3D thumbnails for wayfinding in virtual environments. In Proceedings of the 10th Annual ACM Symposium on User interface Software and Technology (Banff, Alberta, Canada, Oct. 14-17, 1997). UIST '97. ACM, New York, NY, 21-30.

Wang, W., Lin, Q., Ng, J. M., and Low, C. P. 2001. SmartCU3D: a collaborative virtual environment system with behavior based interaction management. In Proceedings of the ACM Symposium on Virtual Reality Software and Technology (Baniff, Alberta, Canada, Nov. 15-17, 2001). VRST '01. ACM, New York, NY, 25-32.

PCT Notification of Transmittal of the International Search Report and the Written Opinion of the International Searching Authority, or the Declaration dated Mar. 23, 2009.

Bares, William H., et al., "Habitable 3D Learning Environments for Situated Learning", ITS-98: Proceedings of the Fourth International Conference on Intelligent Tutoring Systems, San Antonio, Texas, (1998),76-85.

Bares, William H., "Realtime Generation of Customized 3D Animated Explanations for Knowledge-Based Learning Environments", AAAI-97: Proceedings of the Fourtheenth National Conference on Artificial Intelligence, Providence,Rhode Island, (1997),347-354.

Trefftz, Helmuth, et al., "Local and Global Impact of Message Caching in Shared Virtual Environments" Proceedings of the IASTED International Conference on Computer Graphics and Imaging 2000 (CGIM 2000), Las Vegas, NV, Nov. 20, 2000, pp. 8-13.

\* cited by examiner

AUTOMATIC INCREASING OF CAPACITY OF A VIRTUAL SPACE IN A VIRTUAL WORLD

CROSS-REFERENCE TO RELATED APPLICATIONS

This application is a continuation of U.S. patent application Ser. No. 13/341,255, filed Dec. 30, 2011 (status: pending), which is a continuation of U.S. patent application Ser. No. 11/947,829, filed Nov. 30, 2007 (and issued as U.S. Pat. No. 8,127,235 on Feb. 28, 2012), each of which is hereby incorporated by reference herein in its entirety.

BACKGROUND OF THE INVENTION

The present invention is related to virtual space in a virtual world, and more specifically to automatic increasing of capacity of a virtual space in a virtual world.

Virtual reality (VR) worlds bring the best of online and real-world brick and mortar to many scenarios, for example shopping. In the brick and mortar worlds, shopping has both a social and a visually immersive experience. Two dimensional (2D) shopping web sites are convenient (e.g., they do not require traveling to a physical location) and scalable to 1,000s of users by a hosting server. However, they lack that social and visual experience of brick and mortar. Today three dimensional (3D) web sites combine the convenience of online shopping with the social and the visual benefits of brick and mortar. However, they suffer from the scalability issue of brick and mortar.

Current virtual worlds, (e.g., Second Life), differ from traditional 2D web sites in many ways. One way is that if you are looking at a page on the Circuit City® web site, you don't know if you are the only one looking at that page or if there are thousands or perhaps tens of thousands of other users looking at that page at the same time. In virtual worlds, to see something you must be in a particular location to view it. When there are too many avatars in a particular location at the same time, it creates congestion not just for the user who has to attempt to move around all the other avatars, but also for the server that is running that particular virtual space in the virtual world. Therefore, if someone is running a store in a virtual world, they may only want to allow a certain number of avatars in at a time to facilitate a good shopping and user experience as well as control the load on the server running that store. However, a problem exists in that if the store is full, the next avatar desiring access to the store has to be turned away. Currently, one solution to this problem is that when a virtual world store effectively closes, the avatar is put on a waiting list to enter. This is unacceptable to users who will not want to be denied.

BRIEF SUMMARY OF THE INVENTION

According to one aspect of the present invention, a system for automatically increasing a capacity of a virtual space in a virtual world may include a processor and a module operating on the processor for detecting an attempt by an avatar to enter a virtual space in a virtual world. The system may also include another module operating on the processor for determining if an allowable number of avatars are currently in the virtual space. The allowable number of avatars may be determined by at least a capacity of a server that is hosting the virtual space. Another module operating on the processor may be provided for increasing a capacity of the virtual space when the allowable number of avatars is currently in the virtual space. Increasing the capacity of the virtual space may include spawning a replicate new virtual space on a different server in response to the capacity of the server that is hosting the virtual space reaching the allowable number of avatars.

According to another aspect of the present invention, a system for automatically increasing a capacity of a virtual space in a virtual world may include a processor and a module operating on the processor for determining if an allowable number of avatars is currently in the virtual space. The allowable number of avatars may be determined by at least a capacity of a server that is hosting the virtual space. The system may also include another module operating on the processor for increasing a capacity of the virtual space when the allowable number of avatars is currently in the virtual space. Increasing the capacity of the virtual space may include spawning a replicate new virtual space on a different server in response to the capacity of the server that is hosting the virtual space reaching the allowable number of avatars.

According to a further aspect of the present invention, a system for automatically increasing a capacity of a virtual space in a virtual world may include a server, one or more workstations, and a network interconnecting the server and the one or more workstations, wherein the server hosts a virtual world allowing a user at the one or more workstations to control an avatar in the virtual world to access a virtual space. The server may be adapted to detect an attempt by an avatar to enter the virtual space in the virtual world and may determine if an allowable number of avatars is currently in the virtual space. A capacity of the virtual space may be increased when the allowable number of avatars is currently in the virtual space.

According to a still further aspect of the present invention, a computer program product for automatically increasing a capacity of a virtual space in a virtual world may include a computer readable storage medium having computer readable program code embodied therewith. The computer readable program code may include computer readable program code configured to detect an attempt by an avatar to enter a virtual space in a virtual world. The computer readable program code may also include computer readable program code configured to determine if an allowable number of avatars is currently in the virtual space. The allowable number of avatars may be determined by at least a capacity of a server that is hosting the virtual space. The computer readable program code may additionally include computer readable program code configured to increase a capacity of the virtual space when the allowable number of avatars is currently in the virtual space. Increasing the capacity of the virtual space may include spawning a replicate new virtual space on a different server in response to the capacity of the server that is hosting the virtual space reaching the allowable number of avatars.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION OF THE INVENTION

Figure 1:
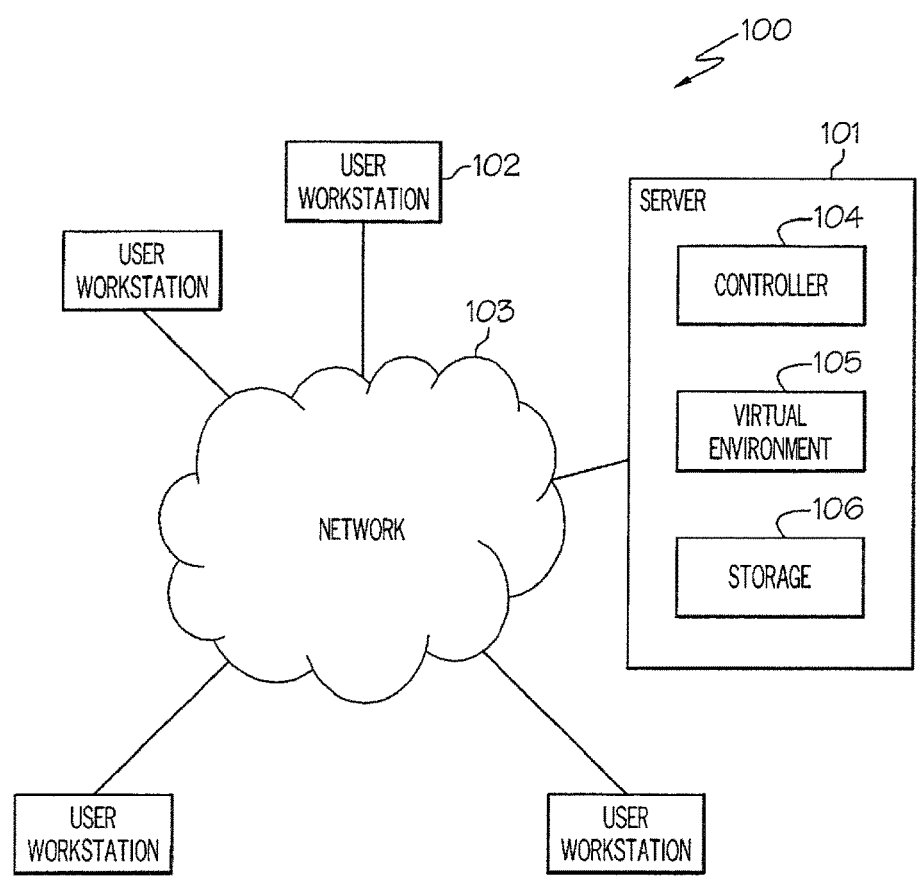
FIG. 1 is a diagram of system for automatically increasing a capacity of a virtual space in a virtual world according to an example embodiment of the present invention.

As will be appreciated by one of skill in the art, the present invention may be embodied as a method, system, computer program product, or a combination of the foregoing. Accordingly, the present invention may take the form of an entirely hardware embodiment, an entirely software embodiment (including firmware, resident software, microcode, etc.) or an embodiment combining software and hardware aspects that may generally be referred to herein as a "system." Furthermore, the present invention may take the form of a computer program product on a computer-usable storage medium having computer-usable program code embodied in the medium.

Any suitable computer usable or computer readable medium may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device; or transmission media such as those supporting the Internet or an intranet. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer usable or computer readable medium may be any medium that can contain, store, communicate, propagate, or transport the program for use by or in connection with the instruction execution system, platform, apparatus, or device. The computer usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency (RF) or other means.

Computer program code for carrying out operations of the present invention may be written in an object oriented, scripted or unscripted programming language such as Java, Perl, Smalltalk, C++ or the like. However, the computer program code for carrying out operations of the present invention may also be written in conventional procedural programming languages, such as the "C" programming language or similar programming languages.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

Embodiments according to the present invention relate to automatically increasing a capacity of a virtual space in a virtual world allowing avatars to enter that would otherwise be put on hold until space is available or denied entry and turned away. A virtual space may be any type or form of virtual space in a virtual world, such as, for example, a store, a business, an arena, a building, a land area, an open space, a room, etc. When an avatar attempts to enter a virtual space in a virtual world, it is determined if an allowable number of avatars are currently in the virtual space and if so, a capacity of the virtual space may be automatically increased. Thus the avatar desiring entry is not turned away or denied.

Owners or managers of a virtual space in a virtual world may set a threshold for the number of avatars that are allowed in the virtual space at any given time to limit overcrowding. A threshold number of allowed avatars may be related to a number for an ideal avatar capacity for the virtual space or may be related to a number for a maximum avatar capacity for the virtual space. The threshold number of avatars may be set based on any one of a variety of factors such as, for example, how large the area is (e.g., the larger the area the more avatars it can hold at one time and still have a positive user experience), how large the server capacity is that is hosting the virtual space in the virtual world, etc. Even if more avatars can fit into the "physical" size of a virtual space area, it may be desired to limit the number of avatars in a virtual space on a given server. For example, if a threshold limit of allowable avatars is set to twenty, when a twenty-first avatar attempts to enter the virtual space, embodiments according to the present invention dynamically increase a capacity of the virtual space in the virtual world.

The virtual space may be automatically increased by dynamically spawning a replicate virtual space or by expanding the physical size of the area of the virtual space. If a replicate virtual space is spawned, this may occur on another partition on the same server hosting the original virtual space or on a different server. Once the new avatar enters a spawned replicate virtual space, initially, the avatar may be alone in the new virtual space while the original virtual space may still be at capacity or at the desired threshold of allowable avatars. Thus, embodiments according to the present invention allow an owner or manager of a virtual space to provide access to avatars without having to turn an avatar away or allow an unlimited number of avatars into the virtual space and have the avatars, or users controlling the avatars, frustrated by a less than desirable experience due to overcrowding in the virtual space.

According to embodiments of the present invention, a manager or owner of a virtual space may define various settings for the virtual space related to avatar access and/or increasing a capacity of the virtual space. A virtual space may have associated settings such as, for example, a maximum avatar capacity for the virtual space, an ideal avatar capacity for the virtual space, a limit on a number of replicate new virtual spaces that may be spawned from the virtual space, a limit on an expansion of a physical size of the virtual space, etc. The capacity for the virtual space may be automatically increased based on an ideal avatar capacity for the virtual space being reached or a maximum avatar capacity for the virtual space being reached, or any other type criteria or setting.

FIG. 1 shows a diagram of system for automatically increasing a capacity of a virtual space in a virtual world according to an example embodiment of the present invention. The system 100 may include a server 101 and one or more workstations 102 where the server 101 and the one or more workstations 102 may be interconnected to a network 103. Although one server 101 is shown, there may be multiple servers connected to the network 103 and accessible by the one or more workstations 102. The server 101 may host the virtual environment 105 and also contain a controller 104 and storage 106. Therefore, a user at a workstation 102 may access the virtual environment 105 hosted on the server 101 and control an avatar in the virtual environment 105 to access a virtual space. An owner or supplier of the service, the item, the event or the virtual space may also access the virtual world or environment 105, hosted on the server 101, via one or more workstations 102 and control an avatar to provide or restrict access to the virtual space. The server 101 may detect an attempt by an avatar to enter a virtual space in the virtual world, determine if an allowable number of avatars are currently in the virtual space, and increase a capacity of the virtual space when the number of allowable avatars is currently in the virtual space.

Figure 2:
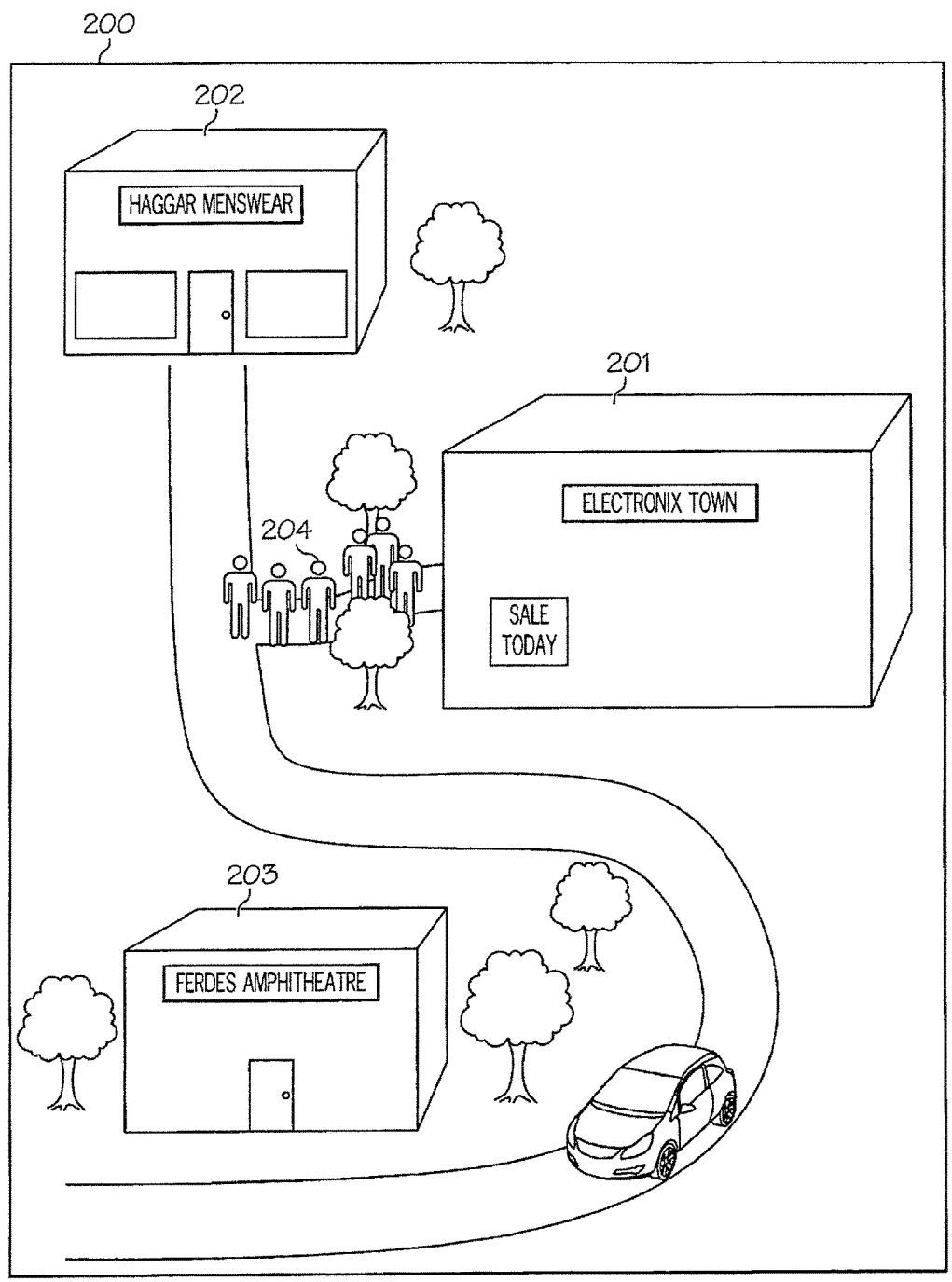
FIG. 2 is a diagram of virtual environment for automatically increasing a capacity of a virtual space in a virtual world according to an example embodiment of the present invention.

FIG. 2 shows a diagram of virtual environment for automatically increasing a capacity of a virtual space in a virtual world according to an example embodiment of the present invention. In the virtual environment/world 200 there may exist an environment containing buildings, stores, trees, cars, people (represented by avatars) and any other items that currently exist in the real world. For example, a virtual world may contain virtual businesses, stores, venues, or other virtual spaces 201, 202, 203 that allow an avatar 204 access to a virtual space.

In this example embodiment, a user may desire to control an avatar 204 to access a virtual space in a virtual world such as, for example, "Electronix Town" 201 to shop for electronics, "Haggar Menswear" 202 to shop for clothing, "Ferdes Amphitheatre" 203 to attend a music or cultural event, etc. The avatar may also desire access to any other types of virtual spaces such as, for example, any type of store, business, arena, building, land area, room, etc. As noted previously, once an attempt by an avatar to enter a virtual space in the virtual world is detected, it may be determined if an allowable number of avatars are currently in the virtual space, and a capacity of the virtual space may be increased when the allowable number of avatars are currently already in the virtual space. For example, if an avatar 204 desires to enter the virtual space "Electronix Town" 201 to shop for electronics, if it is determined that the "Electronix Town" store 201 already has an allowable number of avatars in the store, a capacity of the "Electronix Town" 201 store may be increased, this allowing the avatar 204 to access the store. The capacity of the virtual space may be increased by spawning a replicate new "Electronix Town" virtual space, or by expanding a size of the "Electronix Town" 201 virtual space.

Figure 3:
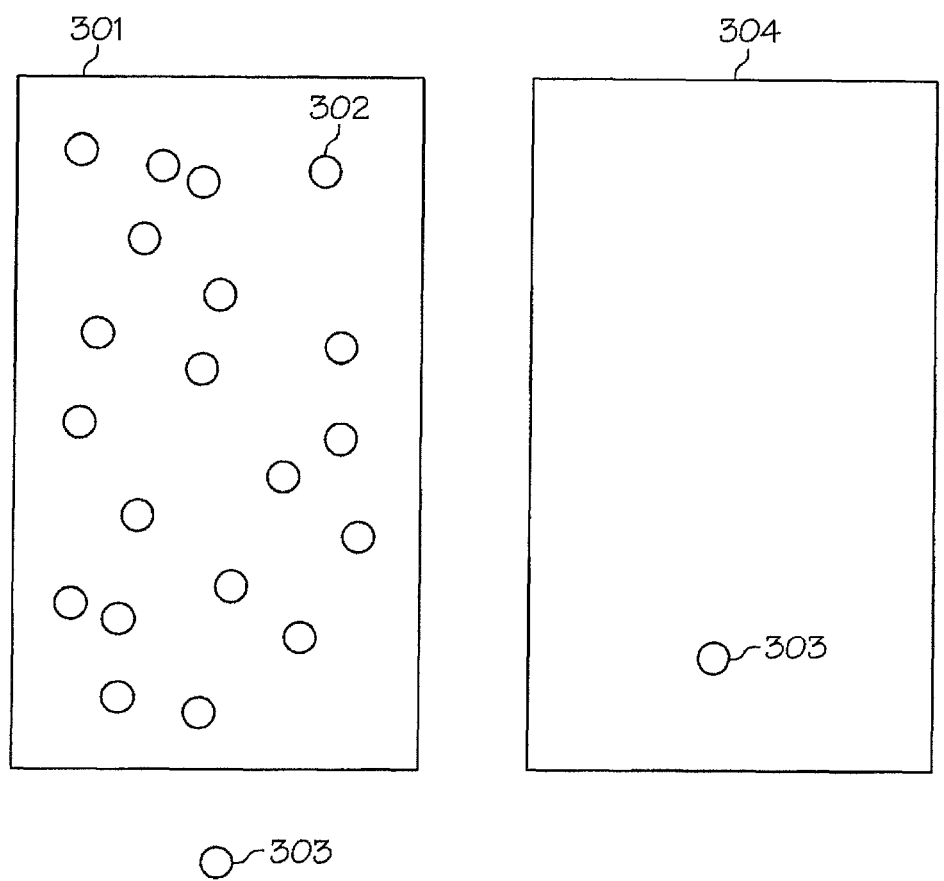
FIG. 3 is a diagram of increasing a capacity of a virtual space by spawning a replicate new virtual space according to an example embodiment of the present invention.

FIG. 3 shows a diagram of increasing a capacity of a virtual space by spawning a replicate new virtual space according to an example embodiment of the present invention. The diagram shows a virtual space 301 that has a number of avatars 302 in the virtual space 301. In this example embodiment, twenty avatars are shown in the virtual space 301, however, embodiments according to the present invention are not limited to any specific number of avatars being in a virtual space. In this example embodiment, the number of avatars in the virtual space is at an allowable number of avatars where it may be desired that no more avatars be allowed into the virtual space 301. When a new avatar 303 (i.e., twenty-first avatar) desires access to the virtual space 301, the capacity of the virtual space 301 may be automatically increased by spawning a replicate new virtual space 304. Therefore, the new avatar 303 (i.e., twenty-first avatar) may then access and enter the newly spawned replicate virtual space 304. The replicate virtual space 304 may be identical and provide the same resources, services, etc. as the original virtual space 301. Should some avatars 302 leave the original virtual space 301 and other new avatars desire entry to the virtual space 301, they may be given access to the original virtual space 301 or to the newly spawned replicate virtual space 304. The newly spawned replicate virtual space 304 may reside on a same server as that hosting the original virtual space 301 or on a different server.

Figure 4:
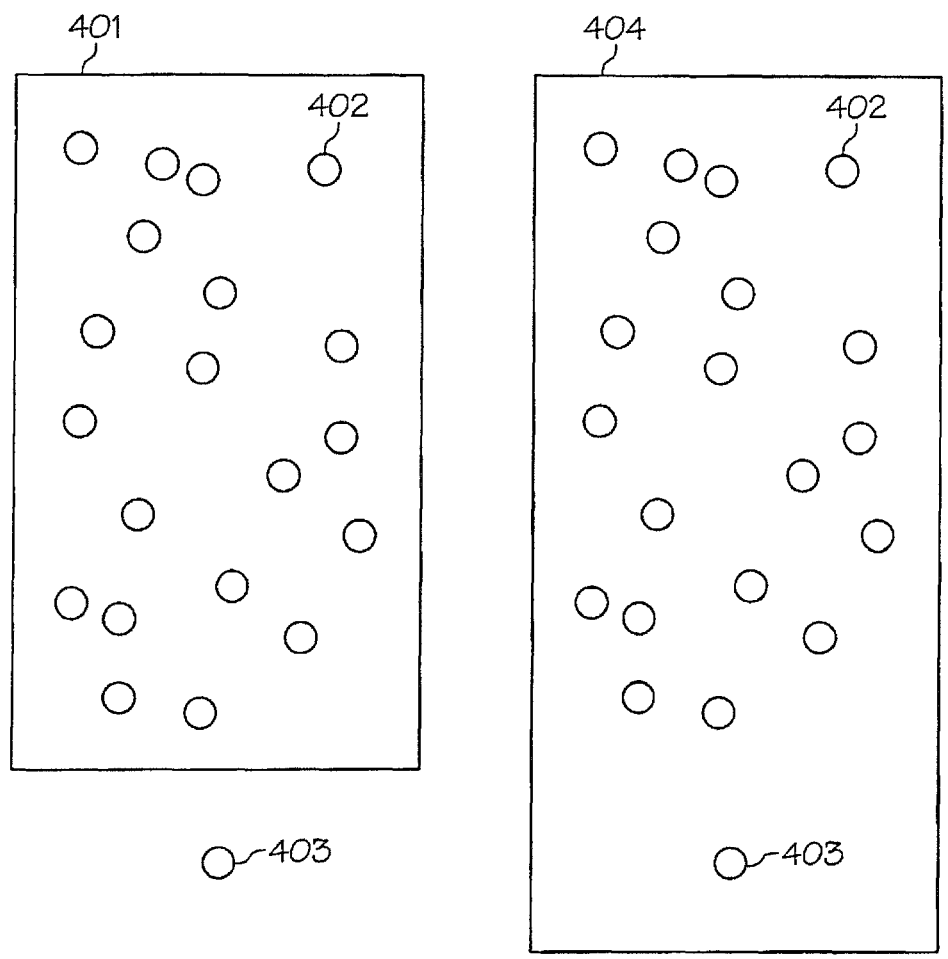
FIG. 4 is a diagram of increasing a capacity of a virtual space by expanding a size of the virtual space according to an example embodiment of the present invention.

FIG. 4 shows a diagram of increasing a capacity of a virtual space by expanding a size of the virtual space according to an example embodiment of the present invention. The diagram shows a virtual space 401 that has a number of avatars 402 in the virtual space 401. In this example embodiment, twenty avatars are shown in the virtual space 401, however, embodiments according to the present invention are not limited to any specific number of avatars being in a virtual space. In this example embodiment, the number of avatars in the virtual space is at an allowable number of avatars where it may be desired that no more avatars be allowed into the virtual space 401. When a new avatar 403 desires access to the virtual space 401, since the virtual space 401 currently has an allowable number of avatars in the virtual space 401, a capacity of the virtual space 401 may be increased by a expanding a physical size of the virtual space 401 as shown in the expanded virtual space 404 with increased physical space. The new avatar 403 may then be allowed to enter the expanded virtual space 404 with increased physical space along with the avatars 402 in the original virtual space 401.

Figure 5:
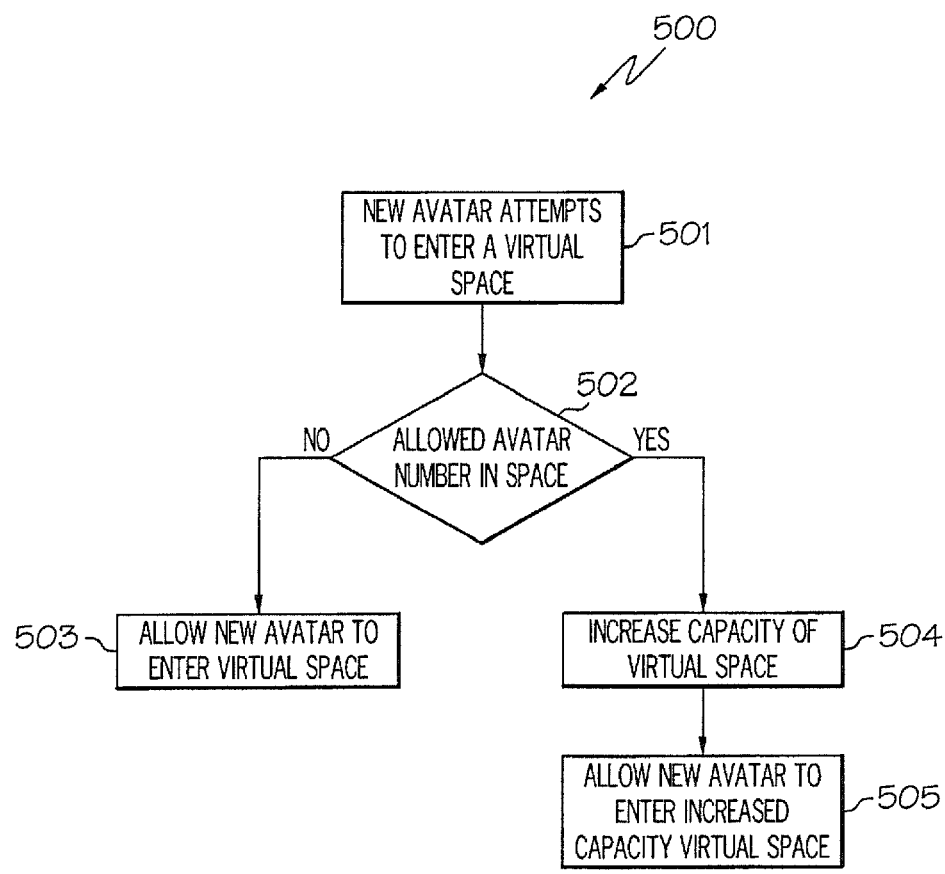
FIG. 5 is a flowchart of a process for increasing a capacity of a virtual space in a virtual world according to an example embodiment of the present invention.

FIG. 5 shows a flowchart of a process for increasing a capacity of a virtual space in a virtual world according to an example embodiment of the present invention. In the process 500, in block 501 a new avatar attempts to enter a virtual space. In block 502, it may be determined if an allowable number of avatars currently exist in the virtual space and if not, in block 503 a new avatar desiring entry into the virtual space may be allowed entry into the virtual space. If it is determined that the allowable number of avatars currently exist in the virtual space, then in block 504, a capacity of the virtual space may be increased. In block 505, the new avatar desiring entry into the virtual space may be allowed to enter the increased capacity virtual space.

Figure 6:
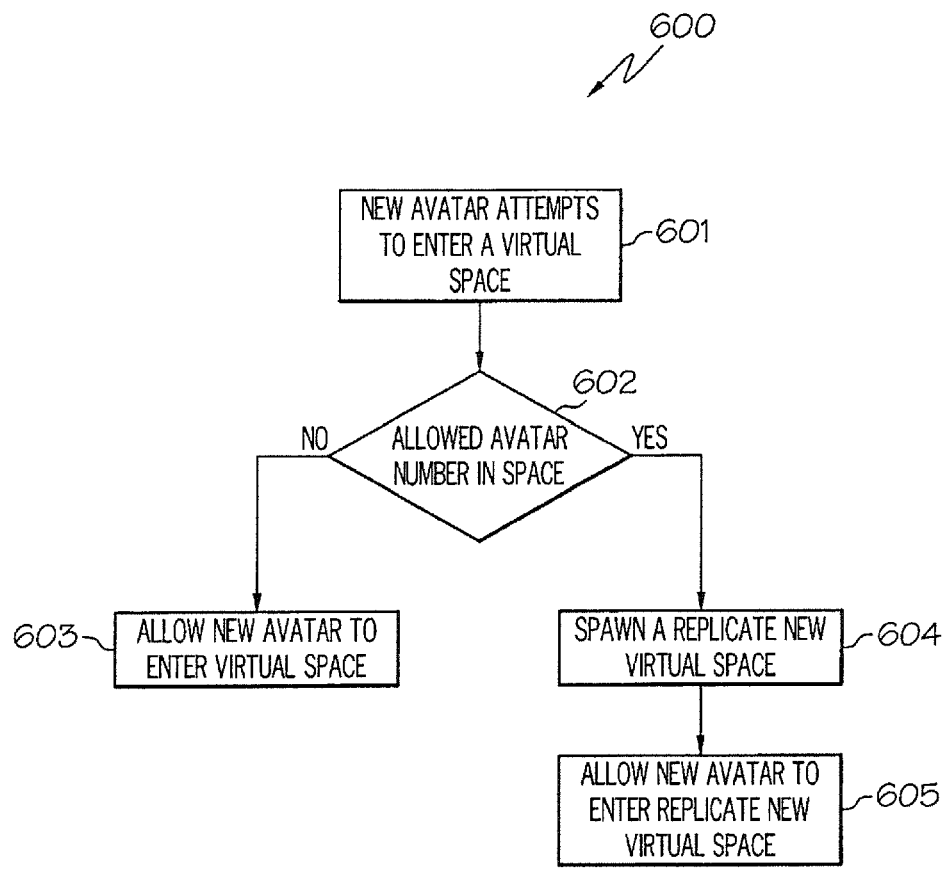
FIG. 6 is a flowchart of increasing a capacity of a virtual space by spawning a replicate new virtual space according to an example embodiment of the present invention.

FIG. 6 shows a flowchart of increasing a capacity of a virtual space by spawning a replicate new virtual space according to an example embodiment of the present invention. In the process 600, in block 601, a new avatar may attempt to enter a virtual space. In block 602 it may be determined if an allowable number of avatars already currently exist in the virtual space and if not, in block 603 the new avatar may be allowed to enter the virtual space. If it is determined that an allowable number of avatars currently exist in the virtual space, in block 604, a replicate new virtual space may be automatically spawned from the original virtual space. Then in block 605, the new avatar may be allowed entry into the replicate new virtual space.

Figure 7:
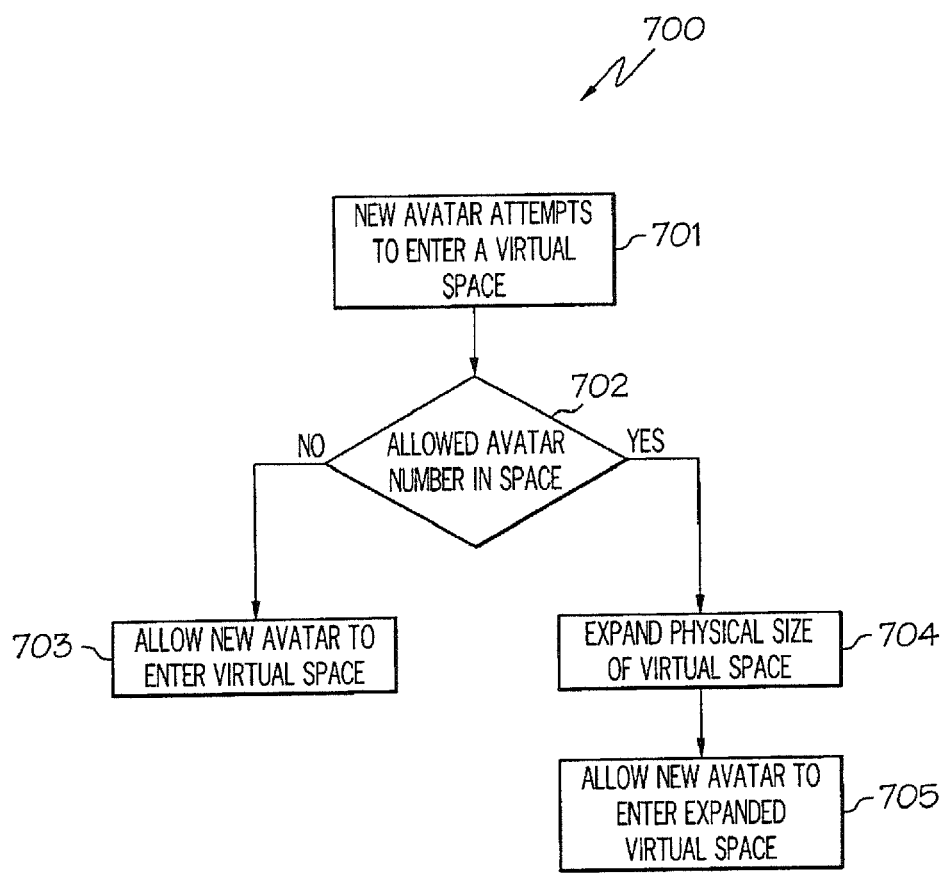
FIG. 7 is a flowchart of a process for increasing a capacity of a virtual space by expanding a physical size of the virtual space according to an example embodiment of the present invention.

FIG. 7 shows a flowchart of a process for increasing a capacity of a virtual space by expanding a physical size of the virtual space according to an example embodiment of the present invention. In the process 700, in block 701, a new avatar may desire entry into a virtual space. In block 702, it may be determined if an allowable number of avatars already currently exist in the virtual space and if not, in block 703, the new avatar may be allowed to enter the virtual space. If it is determined that an allowable number of avatars already currently exist in the virtual space, in block 704, a physical size of the virtual space may be automatically expanded. Then in block 705, the new avatar may be allowed to enter the expanded virtual space.

Figure 8:
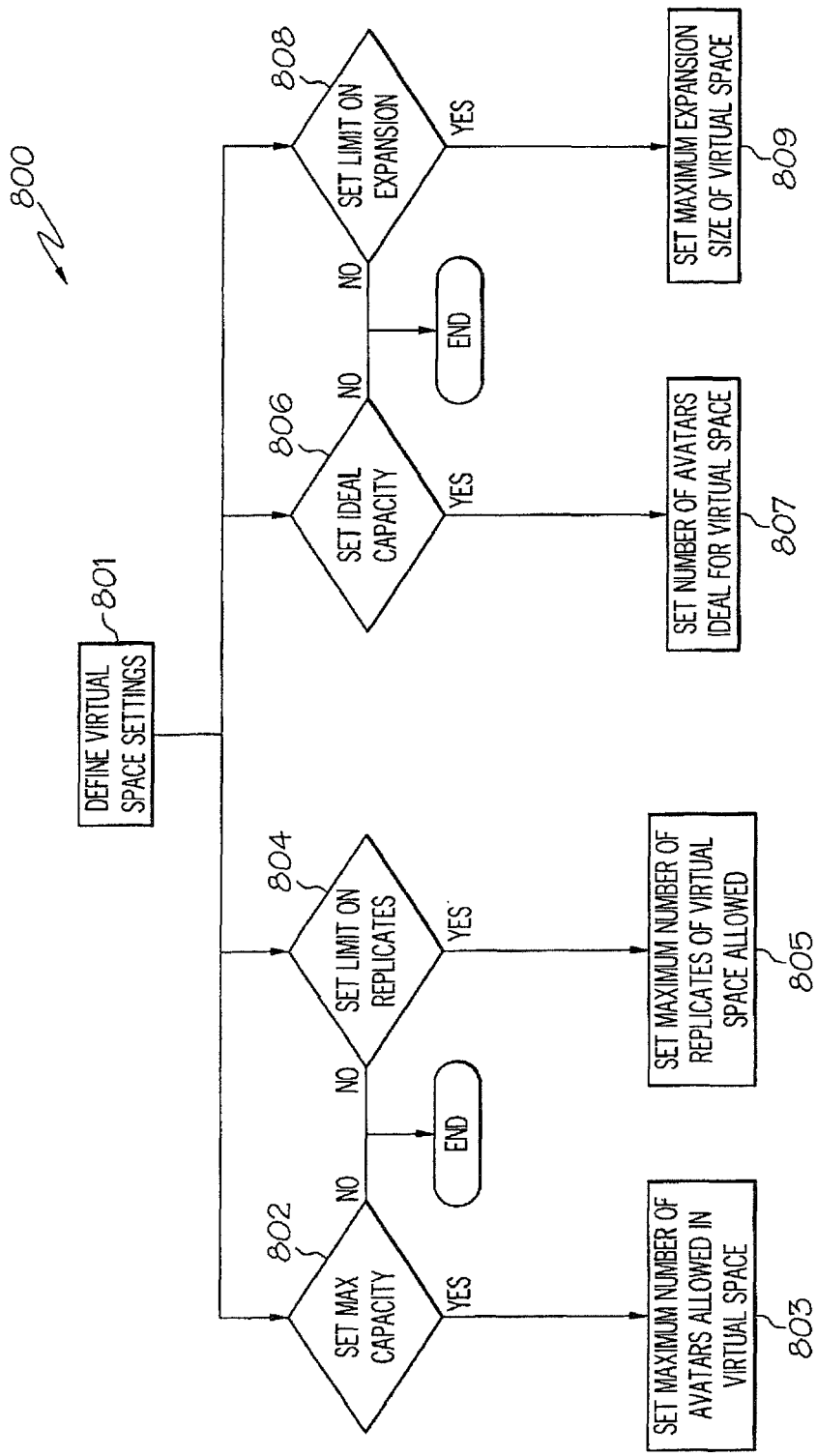
FIG. 8 is a flowchart of a process for defining virtual space settings according to an example embodiment of the present invention.

FIG. 8 shows a flowchart of a process for defining virtual space settings according to an example embodiment of the present invention. In the process 800, in block 801, it may be desired to define settings for a virtual space. In block 802 it may be determined if it is desired to set a maximum allowable avatar capacity value for the virtual space and if not, the process ends. If it is desired to set a maximum allowable avatar capacity for the virtual space, in block 803, a value for a maximum number of avatars allowed to enter the virtual space may be set.

In block 804 it may be determined if it is desired to set a limit on a number of spawned replicate new virtual spaces and if not, the process ends. If it is desired to set a limit on a number of spawned replicate new virtual spaces, in block 805, a maximum number of allowable replicates of the virtual space may be set. In block 806 it may be determined if an ideal allowable capacity of avatars in a virtual space is desired to be set and if not, the process ends. If an ideal allowable capacity of avatars in a virtual space is desired to be set, in block 807, a value for a number of avatars ideal for the virtual space may be set. In block 808, it may be determined if it is desired to set a limit on a physical size expansion of the virtual space and if not, the process ends. If it is desired to set a limit on an expansion of the physical size of the virtual space, then in block 809 a maximum expansion size for the virtual space may be set.

Figure 9:
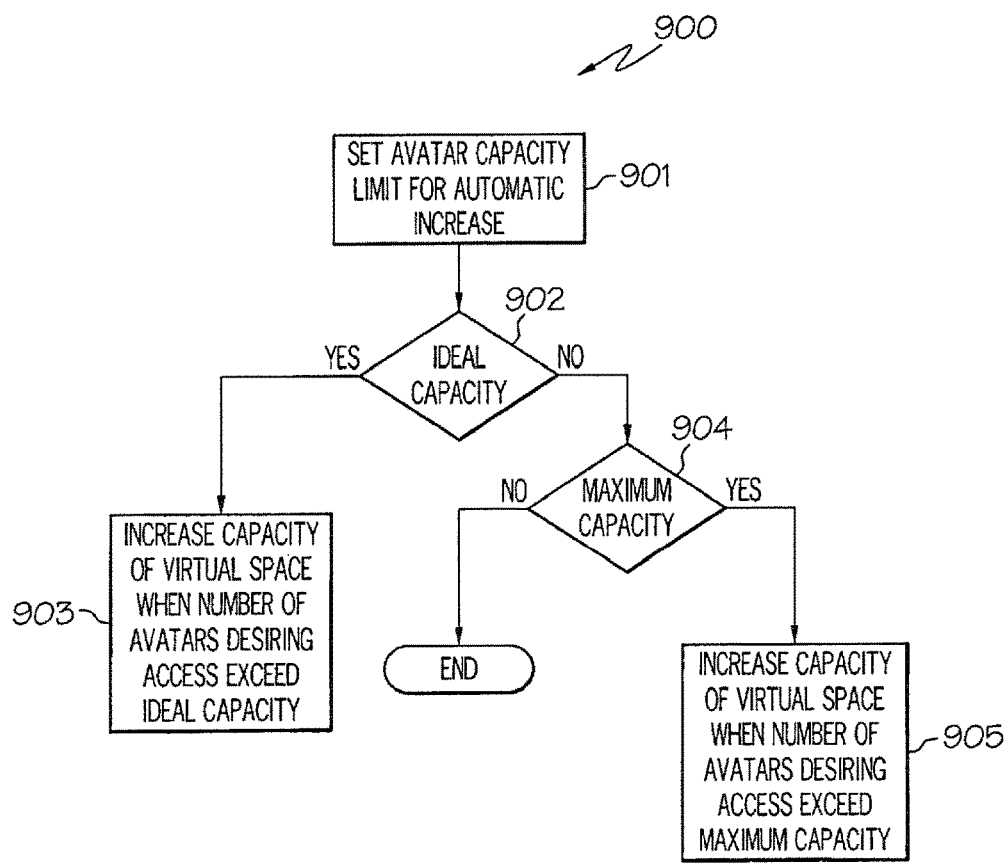
FIG. 9 is a flowchart of a process for setting an avatar capacity limit for automatic increase in capacity according to an example embodiment of the present invention.

FIG. 9 shows a flowchart of a process for setting an avatar capacity limit for automatic increase in capacity according to an example embodiment of the present invention. In the process 900, in block 901, it may be desired to set an avatar capacity limit that initiates an automatic increase in capacity for the virtual space. In block 902, it may be determined if an ideal avatar capacity limit is desired to be set and if so, in block 903, an automatic increase in the capacity of the virtual space may occur when the number of avatars desiring access to the virtual space exceeds an ideal capacity. If it is not desired to set an ideal avatar capacity, in block 904 it may be determined if it is desired to set a maximum avatar capacity limit and if not the process ends. If it is desired to set a maximum avatar capacity, then in block 905, a capacity of the virtual space may be automatically increased when a number of avatars desiring access to the virtual space exceed a maximum capacity of the virtual space.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A system for automatically increasing a capacity of a virtual space in a virtual world, wherein the virtual world is hosted by a server, comprising:
   one or more physical processors programmed with one or more computer program instructions which, when executed, cause the one or more physical processors to:
      detect an attempt by an avatar to enter a virtual space in a virtual world;
      determine a threshold number of avatars for the virtual space;
      determine whether a current number of avatars in the virtual space has reached the threshold number of avatars; and
      increase the capacity of the virtual space in response to the detection of the attempt and a determination that the current number of avatars in the virtual space has reached the threshold number of avatars, wherein the increase of the capacity is achieved by spawning a replicate virtual space, corresponding to the virtual space, in said server.

2. The system of claim 1, wherein the one or more physical processors are further caused to:
   allow the avatar to enter the virtual space in response to the increase of the capacity of the virtual space.

3. The system of claim 1, wherein the one or more physical processors are further caused to:
   increase the threshold number of avatars in response to the increase of the capacity of the virtual space.

4. The system of claim 1, wherein the virtual space comprises at least one of a store, a business, an arena, a building, a land area, or a room.

5. The system of claim 1, wherein increasing the capacity of the virtual space comprises creating a new instance of the virtual space in response to the detection of the attempt and a determination that the current number of avatars in the virtual space has reached the threshold number of avatars.

6. The system of claim 1, wherein the threshold number of avatars is set for the virtual space by at least one of an owner of the virtual space or a manager of the virtual space.

7. The system of claim 6, wherein the threshold number of avatars comprises a maximum avatar capacity for the virtual space.

8. The system of claim 1, wherein increasing the capacity of the virtual space comprises providing a perception of increased physical space in the virtual space in response to the detection of the attempt and a determination that the current number of avatars in the virtual space has reached the threshold number of avatars.

9. The system of claim 1, wherein the threshold number of avatars is based on computer resources available for the virtual space, and wherein the one or more physical processors are further caused to:
   provide additional computing resources for the virtual space in response to the detection of the attempt and a determination that the current number of avatars in the virtual space has reached the threshold number of avatars.

10. A system for automatically increasing a capacity of a virtual space in a virtual world, wherein the virtual world is hosted by a server, comprising:
    one or more physical processors programmed with one or more computer program instructions which, when executed, cause the one or more physical processors to:
       determine a threshold number of avatars for the virtual space based on computing resources available for the virtual space;
       determine whether a current number of avatars in the virtual space has reached the threshold number of avatars; and
       increase the capacity of the virtual space in response to a determination that the current number of avatars in the virtual space has reached the threshold number of avatars, wherein the increase of the capacity is achieved by spawning a replicate virtual space, corresponding to the virtual space, in said server.

11. The system of claim 10, wherein the virtual space comprises at least one of a store, a business, an arena, a building, a land area, or a room.

12. The system of claim 10, wherein increasing the capacity of the virtual space comprises creating a new instance of the virtual space in response to the detection of the attempt and a determination that the current number of avatars in the virtual space has reached the threshold number of avatars.

13. The system of claim 10, wherein increasing the capacity of the virtual space comprises providing a perception of increased physical space in the virtual space in response to the detection of the attempt and a determination that the current number of avatars in the virtual space has reached the threshold number of avatars.

14. A method of automatically increasing a capacity of a virtual space in a virtual world, wherein the virtual world is hosted by a server, the method being implemented on a computer system comprising one or more physical processors executing one or more computer program instructions which, when executed, perform the method, the method comprising:
    detecting, by the computer system, an attempt by an avatar to enter a virtual space in a virtual world;
    determining, by the computer system, a threshold number of avatars for the virtual space;
    determining, by the computer system, whether a current number of avatars in the virtual space has reached the threshold number of avatars; and
    increasing, by the computer system, the capacity of the virtual space in response to the detection of the attempt and a determination that the current number of avatars in the virtual space has reached the threshold number of avatars, wherein the increasing of the capacity is achieved by spawning a replicate virtual space, corresponding to the virtual space, in said server.

15. The method of claim 14, further comprising:
    allowing, by the computer system, the avatar to enter the virtual space in response to the increase of the capacity of the virtual space.

16. The method of claim 14, wherein the threshold number of avatars is based on computer resources available for the virtual space.

17. The method of claim 16, further comprising: providing, by the computer system, additional computing resources for the virtual space in response to the detection of the attempt and a determination that the current number of avatars in the virtual space has reached the threshold number of avatars.

18. The method of claim 14, wherein the virtual space comprises at least one of a store, a business, an arena, a building, a land area, or a room.

19. The method of claim 14, wherein increasing the capacity of the virtual space comprises creating a new instance of the virtual space in response to the detection of the attempt and a determination that the current number of avatars in the virtual space has reached the threshold number of avatars.

20. The method of claim 14, wherein increasing the capacity of the virtual space comprises providing a perception of increased physical space in the virtual space in response to the detection of the attempt and a determination that the current number of avatars in the virtual space has reached the threshold number of avatars.

* * * * *